US008355845B2

(12) United States Patent
Kalb

(10) Patent No.: US 8,355,845 B2
(45) Date of Patent: Jan. 15, 2013

(54) METHOD FOR CONTROLLING AN ACTUATOR

(75) Inventor: Roland Kalb, Rossach (DE)

(73) Assignee: Brose Fahrzeuteile GmbH & Co. Kommanditegesellschaft, Coburg (DE)

( * ) Notice: Subject to any disclaimer, the term of this patent is extended or adjusted under 35 U.S.C. 154(b) by 646 days.

(21) Appl. No.: 12/520,020

(22) PCT Filed: Dec. 18, 2007

(86) PCT No.: PCT/EP2007/011109
§ 371 (c)(1), (2), (4) Date: Feb. 5, 2010

(87) PCT Pub. No.: WO2008/074465
PCT Pub. Date: Jun. 26, 2008

(65) Prior Publication Data

US 2010/0168968 A1 Jul. 1, 2010

(30) Foreign Application Priority Data

Dec. 19, 2006 (DE) .................... 20 2006 019 114 U

(51) Int. Cl.
*E05F 15/16* (2006.01)
*H02H 7/085* (2006.01)
*G06F 19/00* (2006.01)

(52) U.S. Cl. .............................. 701/49; 701/1; 318/476

(58) Field of Classification Search .................... 701/49, 701/1; 318/476, 280, 281
See application file for complete search history.

(56) References Cited

U.S. PATENT DOCUMENTS 6,936,984 B2 * 8/2005 Wilson .......................... 318/280
7,019,478 B2 * 3/2006 Gregori et al. ................ 318/282

FOREIGN PATENT DOCUMENTS

EP 0 910 718 B1 4/1999
FR 2 756 318 A1 5/1998
WO WO 01/92975 12/2001

* cited by examiner

*Primary Examiner* — Tan Q Nguyen
(74) *Attorney, Agent, or Firm* — Muncy, Geissler, Olds & Lowe, PLLC

(57) ABSTRACT

The invention relates to a method for controlling an actuator (1), particularly of a vehicle, wherein the actuator (1) is displaced in a predetermined position (4) by means of a drive (5). The force variable acting on the actuator (1) in the position (4) is determined, compared to a target value, and in case the target value is exceeded, the drive (5) is actuated for system relief. The invention further relates to an displacement system (8) for an actuator (1), particularly of a vehicle, comprising a drive (5) for displacing the actuator (1) and a control module (6), designed for the control of the drive (5) according to the method.

19 Claims, 2 Drawing Sheets

METHOD FOR CONTROLLING AN ACTUATOR

This nonprovisional application is a National Stage of International Application No. PCT/EP2007/011109, which was filed on Dec. 18, 2007, and which claims priority to German Patent Application No. DE 20 2006 019 114.3, which was filed in Germany on Dec. 19, 2006, and which are both herein incorporated by reference.

BACKGROUND OF THE INVENTION

1. Field of the Invention

The invention concerns a method for controlling an actuator, in particular of a motor vehicle. The invention further relates to a motion system for controlling an actuator.

2. Description of the Background Art

In a motion system for an actuator of a motor vehicle, for example in a window regulator system, it is generally necessary to move the associated actuator into a defined location where the actuator is located in a stable position under predefined mechanical loads. This may be, for example, a closed position or an end position of the actuator. Thus, for example, the window of a vehicle door in the closed state must be moved into an end position, wherein the holding force of the window with respect to the adjacent seal must be large enough to compensate for the force of the weight and associated supporting parts, and keep the window stable and hold it closed. In particular, wind noise while driving should be avoided. In a sunroof, too, stability and tightness of seal are vital criteria that determine the requisite holding force. Since the weight is essentially supported by the sunroof itself, the requisite holding force is comparatively small, however. The stationary holding forces actually present in displacement systems of this type are typically greater than the forces that would be necessary for optimal fulfillment of the retaining function, however, since the actuator usually must overcome counteracting forces from a closure element or a seal in order to reach the end position.

In such a motion system, the actuator designed for displacement is typically moved into the mechanical end position with a maximum torque of the associated drive. The maximum torque of the drive must be large enough that the actuator can overcome, during movement, counteracting forces, such as, e.g., resistance counter to the direction of displacement exerted on a window by rubber seals.

In order to realize anti-pinch protection, motion systems are known in which a drive parameter, in particular a torque, is detected as a function of the position of the actuator, and in the case of an irregular deviation from normal behavior, the conclusion is drawn that a case of pinching (or jamming) is occurring. In this case, a predetermined association between the size of the drive parameter and the position of the actuator must be provided, since variations in the drive parameter along the displacement path are to be expected even during normal operation on account of mechanical deficiencies. Thus, for example, during displacement of a side window along a predetermined path, the resistance exerted by the mechanism counter to the direction of displacement can vary in magnitude as a function of position. In this regard, it is important to the functionality of the anti-pinch protection for the real position of the actuator to be known. To this end, a conclusion as to the real position is generally drawn from the number of rotations of the drive, which calls for calibration by means of a reference position.

For the purpose of calibration, the drive is switched off, for example after a specified time has elapsed after the end position has been reached, and the end position is associated with the direction of displacement as a reference position. In order to fulfill the retention function, the actuator is typically moved to the end position using the maximum torque of the drive, and the drive is switched off. In particular, in the case of a self-locking transmission or as a result of the necessary restoring forces against a switched-off drive, the actuator remains essentially in the end position, with the last applied drive torque as the restraining torque, except for an independent partial relaxation of the system, for example resulting from restoring forces during switchoff or from a dissipation of overstresses through the system components or the absorption of such overstresses within system tolerances.

In the stationary state, a strong holding torque disadvantageously exerts a load on the components of the system, since counteracting forces are built up by the holding torque which act as deforming forces on the components if they are dissipated only inadequately or are not dissipated at all. Components in current use made of economical materials, such as plastics, are sensitive to long-term stationary mechanical effects and can be plastically deformed despite toughness and breaking strength. In a motion system, this can lead to faster wear and development of disadvantageous noise during operation. Especially in motion systems with anti-pinch protection using the above-described principle of operation, the position association of the actuator required for identification of a case of pinching can be impaired by stressed parts despite regular calibration. In the event of irregular or abruptly increased resistance, which is sensed by a control module, for example through a reduced speed of the drive or an increased torque, the drive can be erroneously reversed or stopped even when an actual case of pinching is not occurring. As a result, a window that must overcome the counteracting forces of a rubber seal acting over a planar area shortly before reaching the end position—outside of the region of a possible case of pinching—and that requires a high torque for this purpose can be stopped by activation of the anti-pinch protection if the position association is incorrect, so that the window no longer reaches the end position.

SUMMARY OF THE INVENTION

The object of the invention is to specify a method for controlling an actuator which overcomes the disadvantages of the prior art. A second object of the invention is to specify a motion system for an actuator, in particular for a motor vehicle, which has a long service life and functions precisely.

The first object is attained in accordance with the invention in that a method for controlling an actuator is specified in which the actuator is moved to a defined position by means of a drive, in this position a force level acting on the actuator is detected, is compared to a target value, and in the event that the detected force level exceeds the target value, the drive is actuated for system relief.

A force level should be interpreted here as a physical quantity that is based on a force as a variable, in particular a force or force component itself or a quantity composed of a force and another quantity, as for example a torque or a pressure.

The invention is based on the consideration that, in control of the conventional type, the holding torque of the end position is typically greater than the holding torque necessary for the optimal situation-dependent holding function. To this extent, the holding torque can be reduced by controlled stress relief of the system components in the end position without impairing the predetermined system characteristics for the particular position, such as tightness of seal or holding force.

For a motion system of the aforementioned type, presetting and/or limiting the drive torque to the target value of the holding torque for the stationary state of the actuator in the end position generally does not represent a solution, since a high drive torque can be necessary in the vicinity of the end position before said position is reached, for example in order to overcome local counteracting forces there. The end position is thus not reached in the regular case.

The central advantage of the invention is that the quantities determining the holding forces at a given point in time can be adjusted to a variable target value for an actuator which can be moved to a defined position, in particular to an end position, so that stress relief of the system is achieved at any time while retaining the holding function of the actuator. The target value can be preset for a defined position, in particular for an end position, by a function of external state variables. The set of these external state variables can comprise parameters of the system component materials and their thermal reaction behavior, for example. For instance, thermoplastic materials are less capable of bearing loads at higher temperatures than at lower temperatures. Moreover, the set of external state variables can include mechanical coupling constants of the system components which describe how an external mechanical problem between the system components propagates and thus how the system as a whole reacts to such a problem, for example when the system is subjected to vibrational forces. These and other influences can be determinative for the target value. By selective control of the drive through minimal corrections to positioning of the actuator, the relevant force level can be selectively set in adaptation to the target value. A fixed presetting of this quantity, for example of the torque as holding torque, is obviated.

A force level acting on the actuator, for example a resisting force, is equal in magnitude to the force exerted by the actuator which is transmitted by the drive to the actuator. This follows from Newton's third law and makes it possible to coordinate the force level acting on the actuator with the corresponding force level of the drive. Consequently, in the discussion below, a force level acting on the actuator and the corresponding force level exerted by the actuator are considered to be synonymous.

In a preferred embodiment of the invention, in the event that the detected force level exceeds the target value by a tolerance amount, the drive is actuated for system relief. This makes it possible to take into account mechanical variations of the motion system, which may be related to manufacturing, material, or installation factors.

If the actuator can be moved by means of a drive unit that has rotating parts, then a torque is advantageously detected as the force level, since the drive of such a drive unit is characterized by a known torque or can be determined in a known manner. For this purpose, the torque is derived, in particular, from the speed when the characteristic curve of the motor is known and the drive voltage is constant. In contrast, if the actuator travels on magnetic rails or is moved by a linear motor, it is preferred to use linear force components as force levels.

The force levels associated with the actuator in the defined position can be determined through measurement, for example with the aid of a number of essentially uniformly distributed sensors. However, for cost reasons it is advantageous to determine the force levels from drive parameters. This obviates the necessity of detecting the force levels through well-positioned measuring instruments, such as through sensors placed in an essentially uniform distribution. In an advantageous embodiment of this nature, therefore, the need for additional components is eliminated, and the system and method are simplified.

For a drive unit which has rotating parts, a force level that is characteristic for the drive, in particular the torque, can be determined from the speed of the drive. Advantageously, the force level is detected from the known momentary speed through a characteristic curve of the drive. The characteristic curve, in turn, is dependent upon additional parameters, for example on an applied electric drive voltage. Typically, the force level and speed are dependent upon one another through a power law, in particular they are inversely proportional to one another. Consequently, a logarithmic representation of the characteristic curve produces a parameter-dependent linear function.

In a preferred improvement of the method, a target value for the force level in the defined position is predetermined that is a function of the ambient temperature and the state of motion of the system as a whole. To predetermine the target value, it is advantageous to reduce the number of all possible parameters to be determined enough that the ratio of the variation of the target value to the variation of one of the remaining parameters is sufficiently large that it can be resolved as a measured quantity in relation to the fluctuations of the system tolerances. All other parameters may be neglected in practice. In this regard, it is advantageous to consider the global ambient temperature instead of the thermal reaction behavior of the individual components, since in practice the relevant components and their materials are known. Thus, for example, a gear made of thermoplastic material, which is located in the transmission of the drive system, is more easily deformable at an elevated temperature, so the target value of the force level that characterizes the contact between the actuator and the seal in the end position must be lowered. On the other hand, plastics can also exhibit increased resistance on account of thermal expansion, which likewise must be taken into account if necessary.

In addition, it is advantageous for the method to consider a motion quantity of the reference frame of the motion system as compared to the environment as a globally relevant parameter for the target value. Thus, for example, the target value for a moving vehicle is adapted to the speed. At relatively high speeds, a higher target value is needed on account of the higher static pressure than at low speeds or at a standstill in order to avoid wind noise. If the target value is adapted to the speed of travel, a dynamic matching of the target value while taking into account the necessary holding forces is possible, which leads to minimal stress on the system components.

Preferably, the method is improved in such a manner that the force level acting on the actuator after displacement to the defined position is determined after a predefinable period of time. During this so-called relaxation period, the corresponding force level can partially reduce due to independent stress relief through the system components. In this way, the result is achieved that the corrections to be controlled are at minimum smaller and at maximum the same size as without a relaxation period.

As a result of an independent stress relief, the position of the actuator which has been moved to the defined position can be changed slightly. Such a position change can have an effect on a corresponding position change of the drive, when this change is large enough not to be absorbed in the motion tolerances of the system. Preferably the remaining force level acting on the actuator after a relaxation is detected by means of such a position change.

In order to detect the position of the actuator from drive parameters, it is also necessary to define a reference position which the drive motion is placed in relation to. Preferably the drive rotations are counted and the position change relative to the reference position is sensed therefrom. The initially defined position, in particular the end position of the actuator, is preferably chosen as the reference position.

In another preferred improvement of the method, the actuator is moved along a guide means, in particular along a guide rail. In this way, the positioning of the actuator can be detected by means of a parameter in a simpler manner, since a one-dimensional motion takes place.

The second object is attained in accordance with the invention in that a motion system for an actuator, in particular of a motor vehicle, with a drive for moving the actuators and with a control module is specified which is designed for controlling the drive in accordance with a method of the initially mentioned type.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
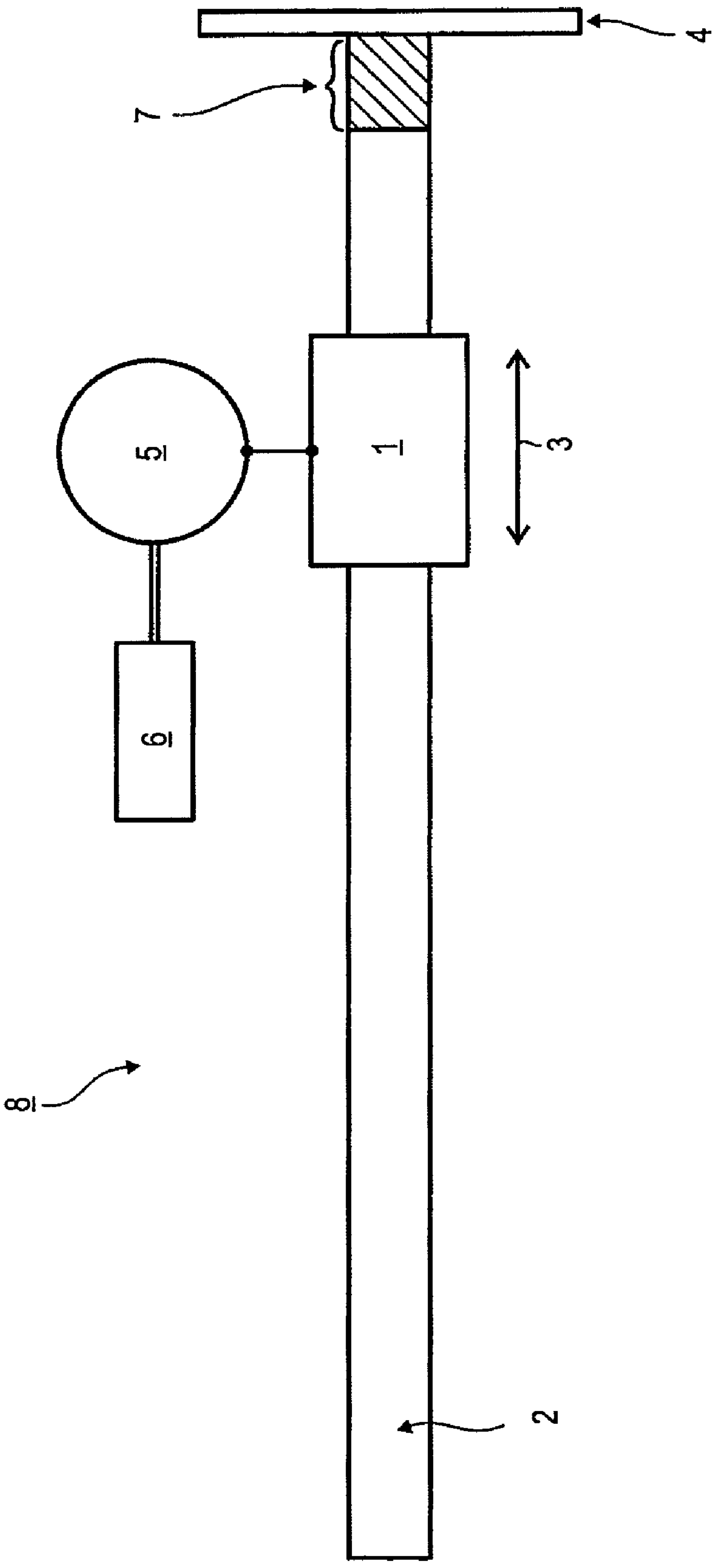
FIG. 1 a schematic representation of a motion system.

FIG. 1 schematically shows a motion system 8, which comprises an actuator 1, which can travel along a guide rail 2 along a direction of displacement 3 up to a defined end position 4. Associated with the actuator 1 is a drive 5, here in the form of an electric motor, which is controlled by a control module 6. The drive 5 has a voltage-dependent characteristic curve, which associates a torque exerted by the drive 5 with a certain speed of the drive 5. When the drive 5 is driven by the control module 6, the actuator 1 is moved in the direction of displacement 3. The resistance to motion here is in equilibrium with the drive force of the actuator 1, so that the drive 5 exerts a defined torque during the process that is associated with a defined speed of the drive 5. The position of the actuator 1 is detected by means of the position change relative to a reference position through the number of drive rotations.

When the actuator 1 now approaches the end position 4, it enters a zone 7 of increased resistance to motion. The equilibrium is disturbed, and the motion, and thus the speed of the drive 5, initially slows. By means of the characteristic curve, an increased torque is established with which the actuator 1 is now driven to the end position 4. After the travel to end position 4, the increased torque of the drive 5 initially acts as a holding torque, since a complete stress relief is prevented by a reverse-blocking transmission of the drive 5. A target value for the holding torque is defined for the end position 4 as a function of external state variables such as temperature or the state of motion of the overall system; this target value is lower than the holding torque currently present after the travel to the end position 4. An excessive holding torque in the stationary state can represent a stress for the system components and can result in premature material wear.

The drive 5 comprises components made of thermoplastic, so that the target value for the torque must be made smaller at elevated temperature in order to avoid plastic deformation. In contrast, an elevated target value is specified when the system as a whole is in motion and greater tightness of the actuator 1 with respect to a seal must be achieved on account of increased static pressure. A higher target value than for the stationary state must also be specified on account of increased vibrations so that the actuator 1 can be stably held in the end position 4.

Once the actuator element 1 has stopped in the end position, the holding torque corresponding to the drive torque after travel to the end position according to the method is partially dissipated by system relaxation. Following a relaxation period of predetermined duration, after which the internal stress relief is completed, which is read out on the basis of a slight motion of the actuator and/or the drive. Since the restoring forces of the system can be described through spring constants, the decrease in the holding torque can be calculated from the path difference of the actuator 1. For the conditions which typically prevail, the relationship between the path difference and the holding torque or holding force can be considered to be essentially linear. The proportionality constant is 40 N/mm, for example. It is also possible to experimentally determine the characteristic curve between path difference and holding force loss, and specify it to the control module. The remaining current holding torque thus determined is then compared with the predefined target value in the control module 6. If the two values differ by more than a defined tolerance, the drive 5 is correctively controlled by the control module 6 to permit system relief such that, after a repeated comparison, the two values differ from one another by no more than the tolerance amount.

Figure 2:
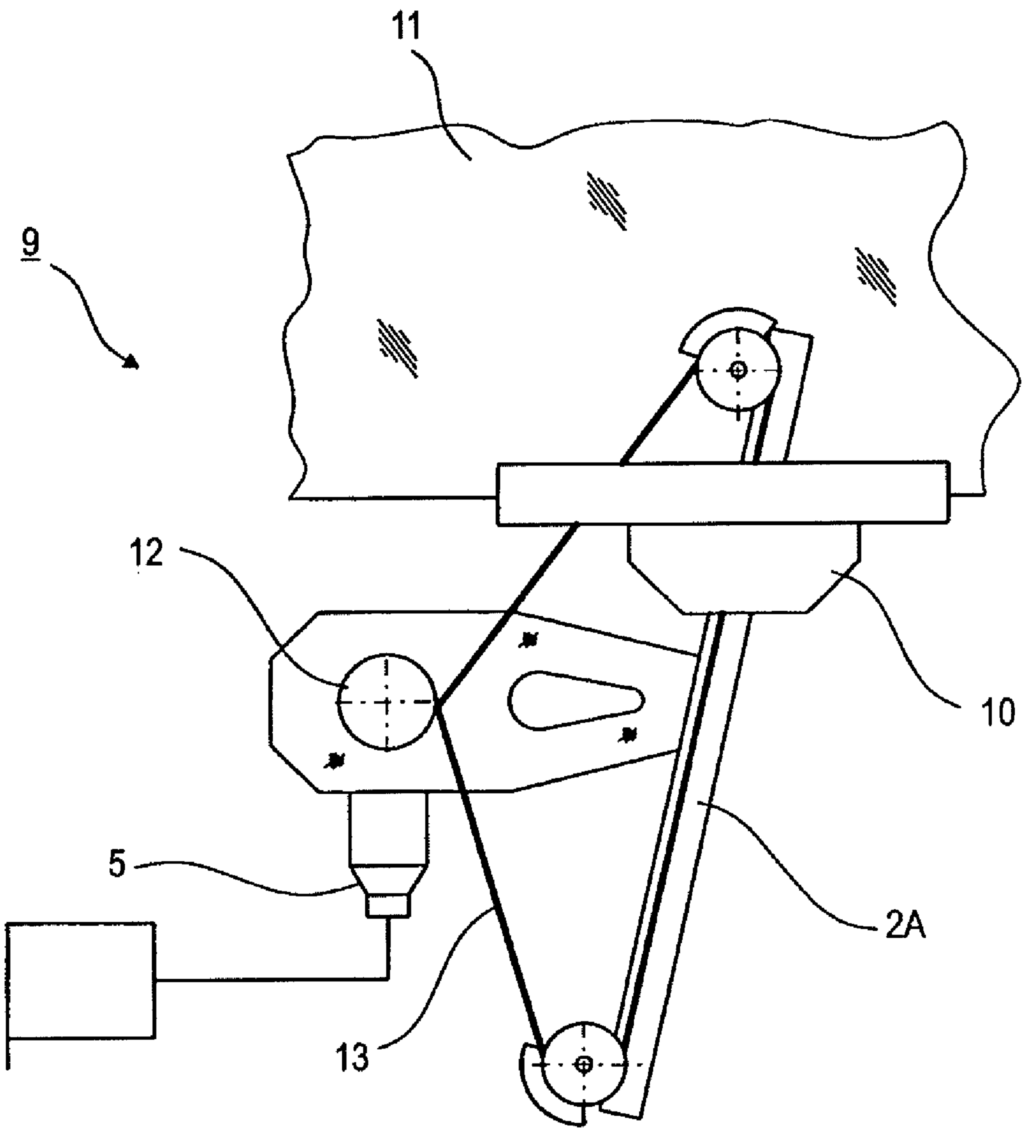
FIG. 2 a window regulator system for a motor vehicle.

FIG. 2 shows a window regulator system 9 for a motor vehicle door in which a carrier 10 can be moved along a guide rail 2A as an actuator, and said carrier can move a window 11. In this system, the drive 5 moves the carrier 10 by means of a cable drum 12, along which passes a cable 13 that is attached to the carrier 10. In addition, a control module 5 is provided which controls the drive 5 in accordance with the aforementioned method.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. Method for controlling an actuator, in particular of a motor vehicle, wherein the actuator is moved to a defined position by means of a drive, in particular to an end position, a force level acting on the actuator in the defined position is detected, the detected force level is compared to a target value, and in the event that the detected force level exceeds the target value, the drive is actuated for system relief.

2. Method according to claim 1, wherein the drive is actuated for system relief in the event that the detected force level exceeds the target value by a tolerance amount.

3. Method according to claim 1, wherein a torque is detected as the force level.

4. Method according to claim 1, wherein the force level is determined from drive parameters.

5. Method according to claim 4, wherein the force level is determined from the speed of the drive, in particular by means of a characteristic curve.

6. Method according to claim 5, wherein the spatial position of the actuator is accomplished by detecting drive rotations with a reference position defined by calibration.

7. Method according to claim 6, wherein the reference position is predetermined by the defined position, in particular by the end position.

8. Method according to claim 6, wherein the actuator is moved along a guide means, in particular a guide rail.

9. Motion system for an actuator, in particular for a motor vehicle, having a drive for moving the actuator and having a control module that is designed to control the drive according to a method in accordance with claim 8.

10. Method according to claim 1, wherein the target value is predetermined as a function of the ambient temperature, the spatial position of the actuator, and/or the state of motion of the system.

11. Method according to claim 10, wherein the detection of the force level takes place after a relaxation period.

12. Method according to claim 11, wherein the force level after the relaxation period is derived from a changed position of the drive and/or of the actuator.

13. Method according to claim 1, wherein the target value is predetermined as function of the ambient temperature of the system as a whole.

14. A system, comprising:

an actuator;

a drive configured to move the actuator to a defined position; and a control module configured to control the drive, said control module configured to:

detect a force level acting on the actuator in the defined position;

compare the detected force level to a target value; and actuate the drive in the event the detected force level exceeds the target value.

15. The system according to claim 14, wherein the drive comprises a voltage-dependent characteristic curve, which associates a torque exerted by the drive with a speed of the drive.

16. The system according to claim 14, wherein as the actuator approaches the defined position the actuator enters a zone of increased resistance to motion, and wherein the drive is configured to apply an increased torque to the actuator to move the actuator through the zone of increased resistance to motion.

17. The system according to claim 14, wherein the force level is detected after an initial system relaxation period.

18. The system according to claim 14, wherein the drive comprises thermoplastic components.

19. A method, comprising:

moving an actuator to a defined position via a drive;

detecting a torque level acting on the actuator in the defined position;

comparing the torque level acting on the actuator to a target value; and actuating the drive in the event the torque level acting on the actuator differs from the target value by more than a defined tolerance.

* * * * *

UNITED STATES PATENT AND TRADEMARK OFFICE

CERTIFICATE OF CORRECTION

PATENT NO. : 8,355,845 B2
APPLICATION NO. : 12/520020
DATED : January 15, 2013
INVENTOR(S) : Kalb It is certified that error appears in the above-identified patent and that said Letters Patent is hereby corrected as shown below:

On the title page, item (73) should read:

Brose Fahr[[r]]zeugteile GmbH & Co. Kommandit[[e]]gesellschaft, Coburg (DE)

Signed and Sealed this
Nineteenth Day of February, 2013

Teresa Stanek Rea
*Acting Director of the United States Patent and Trademark Office*